(12) United States Patent
He et al.

(10) Patent No.: US 11,974,313 B2
(45) Date of Patent: Apr. 30, 2024

(54) USING A SUPPLEMENTARY UPLINK TO MITIGATE A DESENSITIZATION CONDITION

(71) Applicant: Google LLC, Mountain View, CA (US)

(72) Inventors: Fei He, Sunnyvale, CA (US); Bao Phuc Hoang, San Jose, CA (US)

(73) Assignee: Google LLC, Mountain View, CA (US)

( * ) Notice: Subject to any disclaimer, the term of this patent is extended or adjusted under 35 U.S.C. 154(b) by 487 days.

(21) Appl. No.: 17/287,324

(22) PCT Filed: Dec. 19, 2019

(86) PCT No.: PCT/US2019/067356
§ 371 (c)(1),
(2) Date: Apr. 21, 2021

(87) PCT Pub. No.: WO2021/086421
PCT Pub. Date: May 6, 2021

(65) Prior Publication Data
US 2022/0086856 A1    Mar. 17, 2022

Related U.S. Application Data (60) Provisional application No. 62/928,953, filed on Oct. 31, 2019.

(51) Int. Cl.
*H04W 72/12*    (2023.01)
*H04W 24/08*    (2009.01)
(Continued)

(52) U.S. Cl.
CPC ......... *H04W 72/542* (2023.01); *H04W 24/08* (2013.01); *H04W 72/1268* (2013.01); *H04W 72/23* (2023.01)

(58) Field of Classification Search
CPC ............... H04W 72/542; H04W 24/08; H04W 72/1268; H04W 72/23
See application file for complete search history.

(56) References Cited

U.S. PATENT DOCUMENTS 9,026,125 B2    5/2015 Dhanda et al.
2013/0053088 A1*    2/2013 Thorson ................ H04W 52/16
455/522
(Continued)

FOREIGN PATENT DOCUMENTS

EP    2883405    7/2016
WO    2009083927    7/2009

OTHER PUBLICATIONS

"ETSI TS 138 300 V15.2.0", 5G; NR; Overall description; Stage-2 (3GPP TS 38.300 version 15.2.0 Release 15), Sep. 2018, 86 pages.
(Continued)

*Primary Examiner* — Fahmida S Chowdhury
(74) *Attorney, Agent, or Firm* — Colby Nipper PLLC (57) ABSTRACT

This disclosure describes systems and techniques directed to using a supplementary uplink (SUL) to mitigate a desensitization condition. The described systems and techniques include a user equipment having a desensitization manager application that directs the user equipment to determine a presence of a desensitization condition. The desensitization manager application further directs the user equipment to transmit, to a base station, a first message that requests the base station to allocate, to the user equipment, a portion of resources used for a supplementary uplink between the user equipment and the base station. After receiving a second a message from the base station that identifies the allocated portion of the resources, the desensitization manager application directs the user equipment perform uplink transmissions using the allocated portion of the resources.

21 Claims, 7 Drawing Sheets

(51) Int. Cl.
*H04W 72/1268* (2023.01)
*H04W 72/23* (2023.01)
*H04W 72/542* (2023.01)

(56) References Cited

U.S. PATENT DOCUMENTS

| | | | |
|---|---|---|---|
| 2013/0250871 A1* | 9/2013 | Kaukovuori | H04W 72/541 370/329 |
| 2015/0215947 A1* | 7/2015 | Kaukovuori | H04W 72/541 370/329 |
| 2019/0007909 A1 | 1/2019 | Mueck et al. | |
| 2020/0128564 A1* | 4/2020 | Takeda | H04W 72/1215 |
| 2020/0169990 A1* | 5/2020 | Takeda | H04J 1/00 |
| 2020/0344832 A1* | 10/2020 | Hu | H04W 72/0453 |

OTHER PUBLICATIONS

"International Search Report and Written Opinion", PCT Application No. PCT/US2019/067356, dated Jul. 7, 2020, 13 pages.
"International Preliminary Report on Patentability", Application No. PCT/US2019/067356, dated May 3, 2022, 8 pages.

* cited by examiner

| UL Frequency (MHz) | UL RB allocation (start/number) | Victim Rx/Working Frequency (MHz) | UL Tx power(dBm) | Victim DL RSSI (dBm) | DL modulation | Rx desense(dB) | Non-Radio Victim Working order |
|---|---|---|---|---|---|---|---|
| FUL1 | 6/12 | FDL1 | 10 | -70 | 64QAM | 0 | Good |
| FUL2 | 0/10 | FDL2 | 15 | -80 | 256QAM | 0 | Good |
| FUL3 | 4/12 | FDL3 | 18 | -85 | 16QAM | 0 | Good |
| FUL4 | 20/6 | FDL4 | 23 | -90 | 256QAM | 6 | Not Working |
| FUL5 | 10/6 | FDL5 | 23 | -85 | 256QAM | 3 | Not Working |
| ... | ... | ... | ... | ... | ... | ... | ... |
| FUL | a/b | FDL | Txx | Rxx | 256QAM | Dxx | Good |
| FUL | a/b | FDL | Txx | Rxx | 256QAM | Dxx | Not Working |
| FUL | a/b | FDL | Txx | Rxx | 256QAM | Dxx | Good |
| FUL | a/b | FDL | Txx | Rxx | 256QAM | Dxx | Not Working |

UE-Characterization Lookup Table
218

USING A SUPPLEMENTARY UPLINK TO MITIGATE A DESENSITIZATION CONDITION

RELATED APPLICATION(S)

This application is a national stage entry of International Application No. PCT/US2019/067356, filed Dec. 19, 2019, which claims the benefit of U.S. Provisional Application No. 62/928,953, filed Oct. 31, 2019, the disclosures which are incorporated herein by reference in their entirety.

BACKGROUND

As part of Fifth-Generation New Radio (5G NR) wireless communications, resources of an air interface defined by frequency and time domain elements are typically allocated by the base station to a user equipment (UE). In some instances, resource block (RB) allocations of uplink (UL) and downlink (DL) channels may be asymmetric and, in conditions when the UE is transmitting at a high-power level, desensitization of circuitry of the UE may occur. An example of such circuitry is receiver circuitry, which may include antennas, transceivers, and/or chipsets. During instances of desensitization, transmit signal leakage or transmitter noise falling within the bandwidth of the receiver circuitry can reduce signal-to-noise ratios and compromise the performance of the receiver circuitry. This compromise in performance can impact data rates associated with receiving data through the receiver circuitry and, in some instances, result in loss of connectivity.

SUMMARY

This disclosure describes systems and techniques directed to triggering use of a supplementary uplink (SUL) to mitigate a desensitization condition. The described systems and techniques include a UE having a desensitization manager application that determines a desensitization condition induced through Fifth-Generation New Radio (5G NR) wireless communications between the UE and a base station. The desensitization manager application mitigates the desensitization condition by triggering a message from the UE to the base station. The message requests the base station to allocate, to the UE, a portion of resources used for a supplementary uplink (SUL) between the UE and the base station. After receiving a message from the base station that identifies the allocated portion of the resources, the desensitization manager application directs the UE to perform uplink transmissions using the allocated portion of the resources.

In some aspects, a method performed by a UE wirelessly communicating with a base station is described. The method includes the UE analyzing characteristics of a downlink signal and an uplink transmission configuration and determining, using the analyzed characteristics of the downlink signal and the uplink transmission configuration, a presence of a desensitization condition. In response to determining the presence of the desensitization condition, the UE transmits, to the base station, a first message that requests the base station to allocate a portion of resources used for a supplementary uplink (SUL). The method continues, where the UE receives, from the base station, a second message that identifies the allocated portion of the resources and transmits, to the base station, a third message using the allocated portion of the resources.

In other aspects, a UE is described. The UE includes a processor and computer-readable storage media storing instructions of a desensitization manager application that, when executed by the processor, directs the UE to analyze characteristics of a downlink signal and an uplink transmission configuration and determine, using the analyzed characteristics of the downlink signal and the uplink transmission configuration, a presence of a desensitization condition. In response to determining the presence of the desensitization condition, the desensitization manager application directs the UE to transmit, to the base station, a first message that requests the base station to allocate a portion of resources used for a supplementary uplink (SUL). The desensitization manager application further directs the UE to receive, from the base station, a second message that identifies the allocated portion of the resources and transmit, to the base station, a third message using the allocated portion of the resources.

In other aspects, a method performed by a base station wirelessly communicating with a UE is described. The method includes the base station receiving, from the UE, a first message that requests an allocation of a portion of resources used for a supplementary uplink (SUL). The method includes the base station selecting, from the resources used for the supplementary uplink, the portion of the resources for allocation and transmitting, to the user equipment, a second message that identifies the allocated portion of the resources. The method also includes the base station receiving, from the user equipment a third message using the allocated portion of the resources.

The described systems and techniques may also apply to desensitization conditions associated with non-radio circuitry on the UE. For example, as opposed to a receiver desensitization condition, the systems and techniques may apply to a camera desensitization condition, a display desensitization condition, or a touch sensor desensitization condition. In such instances, messaging between the UE and the base station may effectuate allocation and use of portions of resources used for a SUL between the UE and the base station.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of using a SUL to mitigate a desensitization condition. The use of the same reference numbers in different instances in the description and the figures may indicate like elements.

DETAILED DESCRIPTION

The present disclosure describes systems and techniques directed to triggering use of a supplementary uplink through referencing a UE-characterization lookup table. The described systems and techniques include a method performed by a UE wirelessly communicating with a base station. The UE includes a desensitization manager application that references the UE-characterization lookup table to determine the presence of a receiver desensitization (desense) condition. In response to determining the presence of the receiver desensitization condition, the UE transmits a first message to the base station that requests the base station to allocate resources of a supplementary uplink (SUL). The UE receives, from the base station, a second message. The second message identifies an allocated set of resources of the SUL. The UE then transmits, using the allocated set of resources of the SUL, a third message to the base station that directs the base station to perform an operation.

While features and concepts of the described systems and techniques for such can be implemented in any number of different environments, systems, devices, and/or various configurations, aspects are described in the context of the following example devices, systems, and configurations.

Operating Environment

Figure 1:
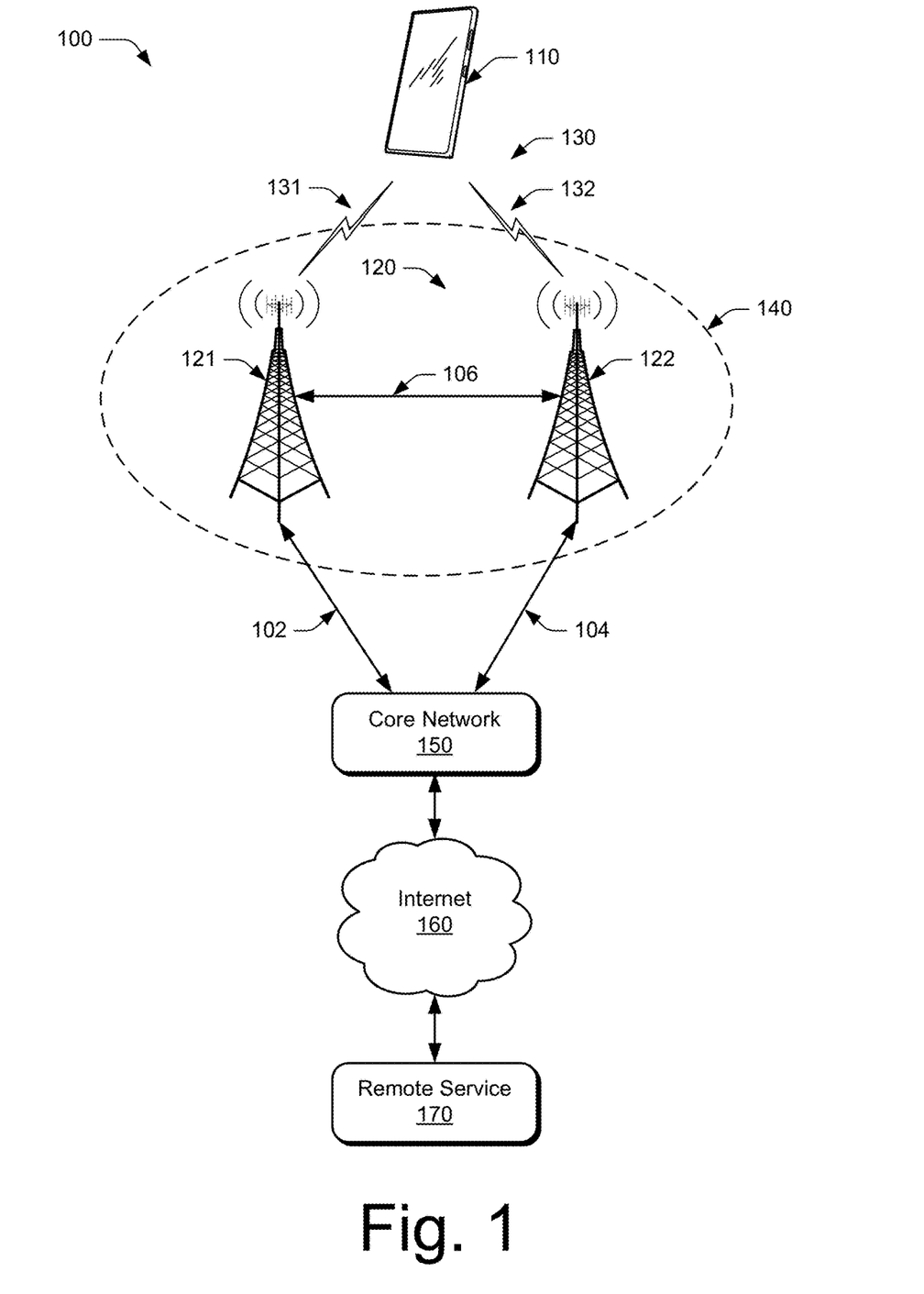
FIG. 1 illustrates an example operating environment in which various aspects of using a supplementary uplink to mitigate a desensitization condition is implemented.

FIG. 1 illustrates an example environment 100 which includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, a smartwatch, a modem, cellular phone, gaming device, navigation device, media device, laptop computer, desktop computer, tablet computer, smart appliance, vehicle-based communication system, or an Internet-of-Things (IoT) device. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, and the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth-Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The wireless links 130 may use resources allocated for uplink transmissions from the UE 110 to the base station 120 and downlink transmissions from the base station to the UE 110. Due to factors that include transmitting power the UE 110, a low frequency band (e.g., sub 3-GHz) may be desired to improve uplink transmissions (e.g., improve an uplink direction transmission range). In such instances, a supplementary uplink (SUL) as specified by a wireless-communication protocol may be used to improve the uplink transmissions. A wireless-communication protocol such as 3GPP TS 38.101 may specify parameters (e.g., a frequency band, a transmission power, a reference sensitivity power level) for use by the UE 110 when performing uplink transmissions using the SUL.

The base stations 120 are collectively a Radio Access Network 140 (e.g., 5G NR RAN or NR RAN). The base stations 121 and 122 in the RAN 140 are connected to a 5G NR core network (e.g., 5GC 150). The base stations 121 and 122 connect, at 102 and 104 respectively, to the 5GC 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The UE 110 may connect, via the core network 150, to public networks, such as the Internet 160 to interact with a remote service 170.

Within the example operating environment 100, the UE 110 may determine a presence of a receiver desensitization condition, wherein the receiver desensitization condition causes a loss of sensitivity as measured in decibels (dB)) of RX circuitry of the UE. Furthermore, and within the example operating environment 100, the wireless link 130 may include resources (e.g., air interface resources) of a supplementary uplink (SUL).

Example Systems

Figure 2:
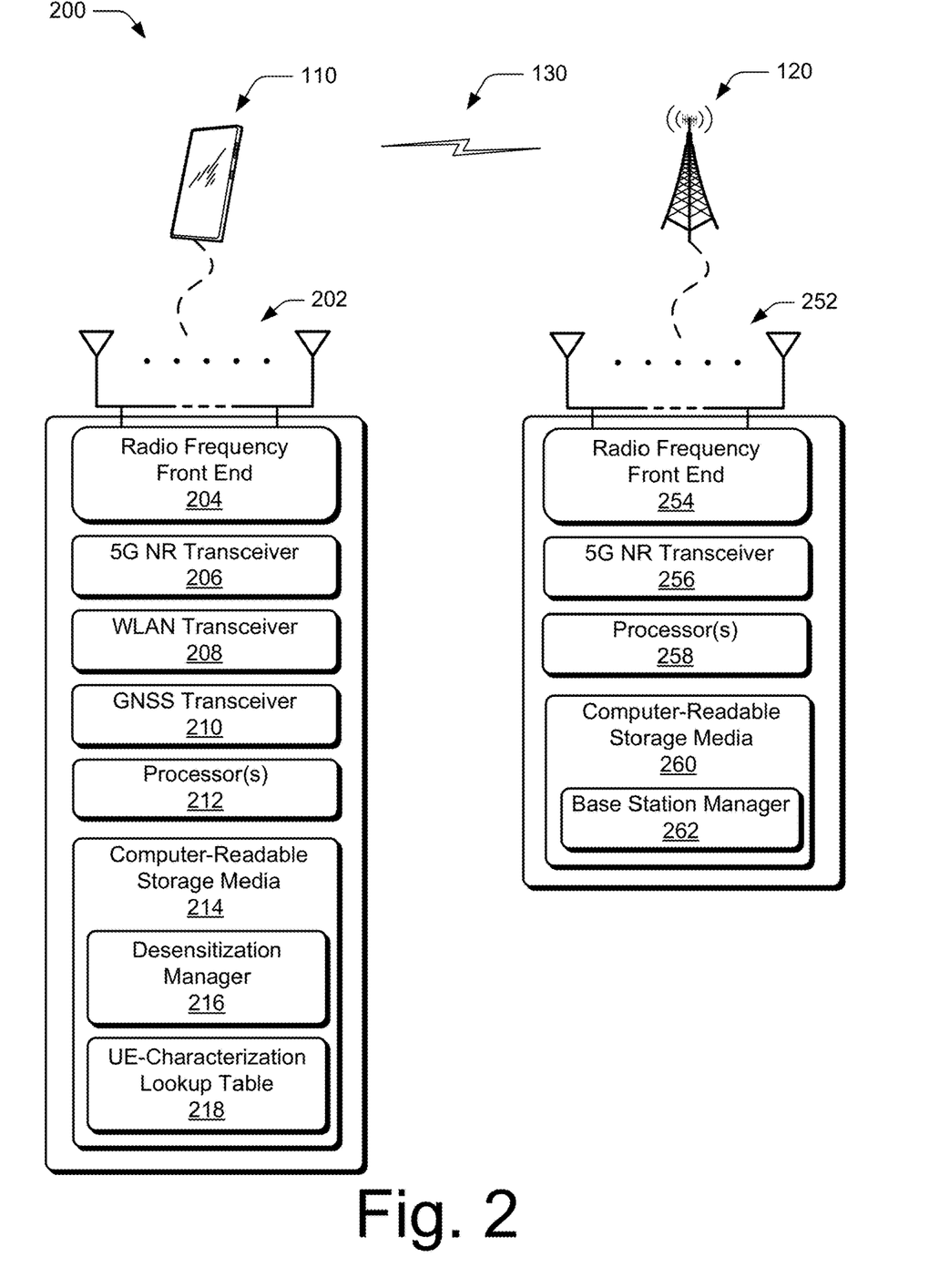
FIG. 2 illustrates example details of devices that may implement various aspects of using a supplementary uplink to mitigate a desensitization condition.

FIG. 2 illustrates example details of devices that may implement various aspects of using a supplementary uplink to mitigate a desensitization condition. FIG. 2 includes a UE (e.g., the UE 110 of FIG. 1) and a base station (e.g., the base stations 120 of FIG. 1). The UE 110 and the base station 120 may include additional functions and interfaces that are omitted from FIG. 2 for the sake of clarity. The UE 110 includes antennas 202 and a radio frequency front end 204 (RF front end 204). The UE 110 includes a Fifth-Generation New Radio (5G NR) transceiver 206 for communicating with the base station 120 using wireless link 130. The UE 110 also includes a wireless local area network (WLAN) transceiver 208 (e.g., for communicating with a router) and a global navigation satellite system (GNSS) transceiver 210 for communicating with a satellite. The RF front end 204 of the UE 110 can couple or connect the 5G NR transceiver 206, the WLAN transceiver 208, and the GNSS transceiver 210 to the antennas 202 to facilitate various types of wireless communication. The antennas 202 of the UE 110 may include an array of multiple antennas that are configured similar to or differently from each other.

Portions of the antennas 202, the RF front end 204, the 5G NR transceiver 206, the WLAN transceiver 208, and the GNSS transceiver 210 may receive a wide spectrum of electromagnetic waves used for wireless communications. These portions may collectively be referred to as receiving circuitry (e.g., RX circuitry) of the UE 110.

The UE 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory.

CRM 214 stores an executable application (e.g., desensitization manager application 216) for directing the UE 110 to perform operations relative to determining a receiver desensitization condition local to the UE 110 exists. CRM 214 also stores a UE-characterization lookup table 218. In general, the UE 110 has inherent receiver desensitization performance characteristics that are attributable to the design and construction of the UE 110 (e.g., printed circuit boards, transceiver chipsets, resistors, capacitors). In some instances, these receiver desensitization performance characteristics for an individual UE can measured in a laboratory environment and stored in the UE-characterization lookup 218. In other instances, these receiver desensitization performance characteristics can be associated to a model of the UE and stored in the UE-characterization lookup table 218 during high volume manufacturing.

In at least some aspects, the desensitization manager application 216, when executed by the processor 212, may direct the UE 110 to perform operations that include (i) referencing the UE-characterization lookup table 218 to determine that a receiver desensitization condition exists, (ii) transmit a first message to the base station 120 that requests the base station 120 to allocate resources from a SUL, (iii) receive a second message from the base station 120 that identifies a set of allocated resources from the SUL, and (iv) transmit a third message to the base station 120 using the set of allocated resources from the SUL.

The base station 120 includes antennas 252, a radio frequency front end 254 (RF front end 254) and a 5G NR transceiver 256 for communicating with the UE 110. The RF front end 254 of the base station 120 can couple or connect the 5G NR transceiver 256 to the antennas 252 to facilitate various types of wireless communication. The antennas 252 of the base station 120 may include an array of multiple antennas that are configured similar to or differently from each other.

The base station 120 also includes processor(s) 258 and computer-readable storage media 260 (CRM 260). The processor 258 may be a single core processor or a multiple core processor composed of a variety of materials, such as silicon, polysilicon, high-K dielectric, copper, and so on. CRM 260 may include any suitable memory or storage device such as random-access memory (RAM), static RAM (SRAM), dynamic RAM (DRAM), non-volatile RAM (NVRAM), read-only memory (ROM), or Flash memory.

The CRM 260 also includes a base station manager application 262. Alternately or additionally, the base station manager application 262 may be implemented in whole or part as hardware logic or circuitry integrated with or separate from other components of the base station 120.

CRM 260 includes an executable application (e.g., base station manager application 262) that manages an air interface between the UE 110 and the base station 120. In at least some aspects, the base station manager application 262, when executed by the processor 258, may direct the base station 120 to perform operations that include (i) receiving a first message from the UE 110 that requests an allocation of resources of a SUL, (ii) allocating a set of resources of the SUL, (iii) transmitting, to the UE 110, a second message, wherein the second message identifies the allocated set of resources and (iv) receive, using the allocated set of resources of the SUL and from the UE 110, a third message that directs the base station 120 to perform an operation (e.g., relay the message to a network such as the 5GC 150).

Figure 3:
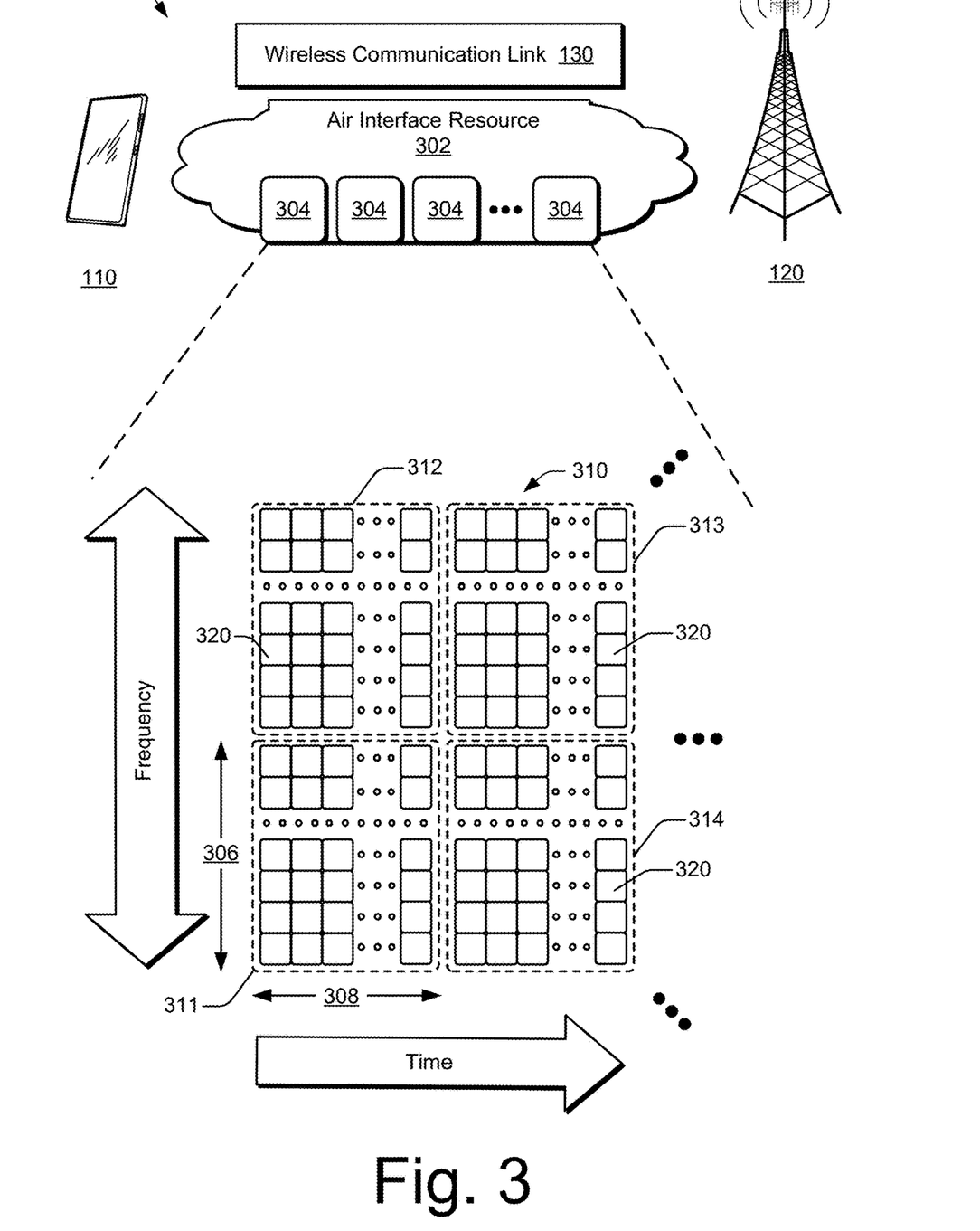
FIG. 3 illustrates an example air interface that extends between a user equipment and a base station.

FIG. 3 illustrates an example interface 300 that extends between a UE (e.g., the UE 110) and a base station (e.g., the base station 120), which may include resources of the SUL. The example interface 300 includes unified air interface resources 302 that can be divided into resource units 304, each of which occupies some intersection of frequency spectrum and elapsed time. A portion of the unified air interface resources 302 is illustrated graphically in a grid or matrix having multiple resource blocks (RBs) 310, including example RBs 311, 312, 313, 314. An example of a resource unit 304 therefore includes at least one RB 310. As shown, time is depicted along the horizontal dimension as the abscissa axis, and frequency is depicted along the vertical dimension as the ordinate axis. The unified air interface resources 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations and generally, the base station 120 schedules and allocates portions (e.g., resource units 304) of the unified air interface resources 302 for uplink and downlink communications, including resources that may be used for the SUL. Each resource block 311 of network access resources may be allocated to support a wireless link 130 of the UE 110. In the lower-left corner of the grid, the RB 311 may span, as defined by a given communication protocol, a specified frequency range 306 and comprise multiple subcarriers or frequency sub-bands. The RB 311 may include any suitable number of subcarriers (e.g., 12) that each corresponds to a respective portion (e.g., 15 kHz) of the specified frequency range 306 (e.g., 180 kHz). The RB 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each RB 310 may include multiple resource elements 320 (REs) that correspond to, or are defined by, a subcarrier of the frequency range 306 and a subinterval (or symbol) of the time interval 308. Alternatively, a given RE 320 may span more than one frequency subcarrier or symbol. Thus, a resource unit 304 may include at least one RB 310, at least one RE 320, and so forth.

As part of wireless communications between the UE 110 and the base station 120, scheduling and allocations of the unified air interface resources 302, as performed by the base station 120 (e.g., the processor 258 executing the code of the base station manager application 262), may be dynamic. The allocations of the unified air interface resources 302 may correspond to portions of the SUL. In some instances, allocations of the unified air interface resources 302 corresponding to the portions of SUL may be at a resource block (e.g., RB 310) granularity. In other instances, allocations of the unified air interface resources 302 corresponding to the portions of the SUL may be at a resource element (e.g., RE 320) granularity.

Figure 4:
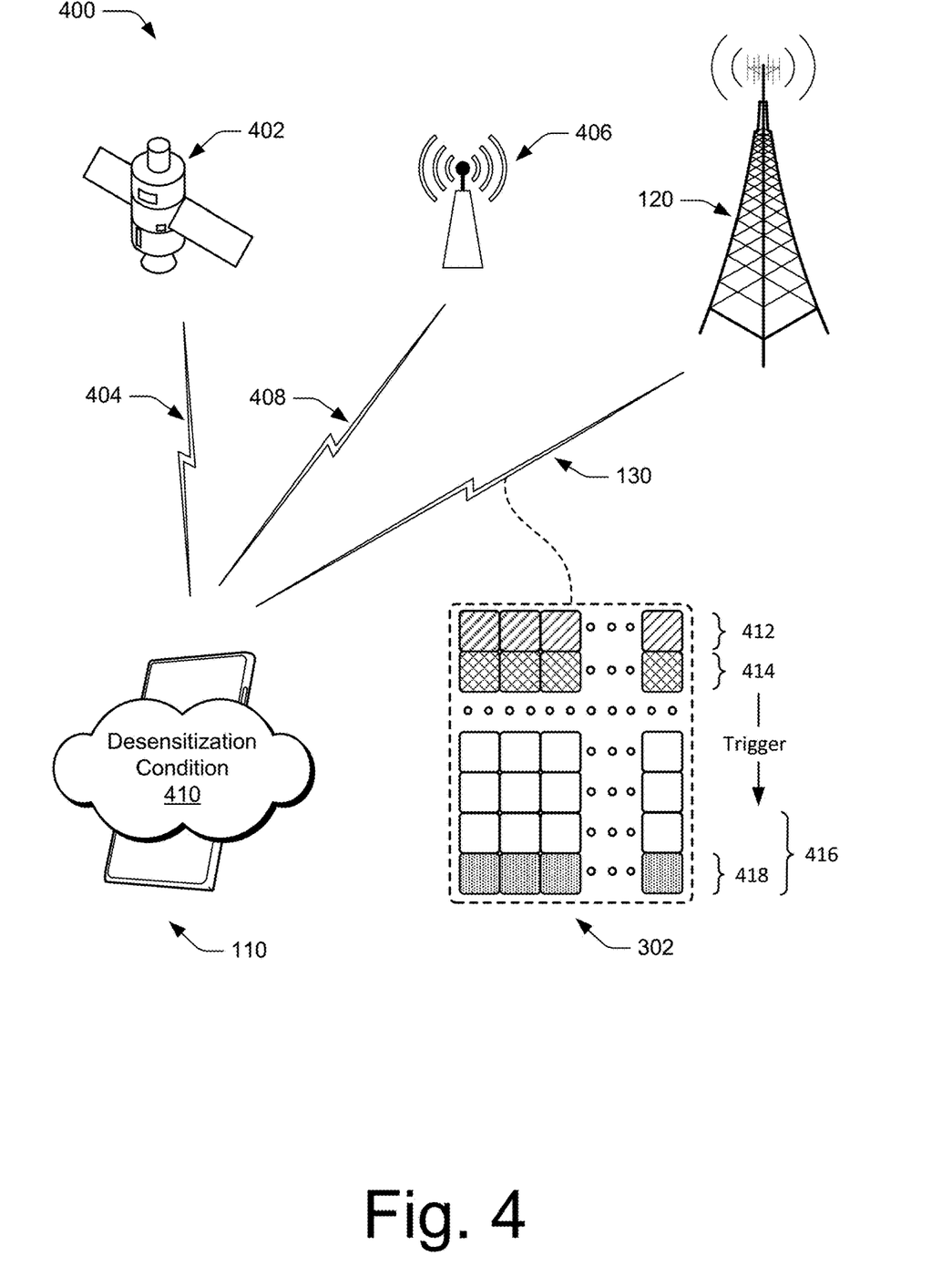
FIG. 4 illustrates details of an example implementation of using a supplementary uplink to mitigate a desensitization condition.

FIG. 4 illustrates details 400 of an example implementation of using a supplementary uplink to mitigate a desensitization condition. The UE may be the UE 110 of FIG. 1, using elements of FIGS. 1-3. In this example implementation, the desensitization condition is associated with desensitization of receiver circuitry of the UE 110 (e.g., receiver circuitry of the 5G NR transceiver 206, the WLAN transceiver 208, the GNSS transceiver 210).

As illustrated by FIG. 4, a satellite 402 of a global navigation satellite system (GNSS) (e.g., global positioning system (GPS)) network is wirelessly communicating with the UE 110 using wireless link 404. An access point 406 of a wireless local area network (WLAN) is wirelessly communicating with the UE 110 using wireless link 408. The base station 120 of the 5GC network 150 is wirelessly communicating with the UE 110 using the wireless link 130. In general, the UE 110 is wirelessly communicating with the satellite 402, the access point 406, and the base station 120 using wireless-communication hardware (e.g., GNSS transceiver 210, WLAN transceiver 208, 5G NR transceiver 206) having respective RX circuitry.

In the instance of the wireless link 130 that supports wireless communication between the base station 120 and the UE 110, the base station 120 (e.g., the processor 258 executing the code of the base station manager application 262) allocates downlink (DL) resources 412 of air interface resources 302 for downlink channels from the base station 120 to the UE 110. The base station 120 also allocates uplink (UL) resources 414 of air interface resources 302 for uplink channels from the UE 110 to the base station 120. As illustrated in FIG. 4, the DL resources 412 and the UL resources 414 are adjacent, in frequency, to one another. The base station 120 also manages resources used for a supplementary uplink (e.g., SUL resources 416).

As illustrated in FIG. 4, the UE 110 (e.g., the processor 212 executing the code of the desensitization manager application 216) determines a presence of a desensitization condition (e.g., desensitization condition 410). The desensitization condition 410 is based, in part, on the frequency-proximity of the UL channel and DL channel, as well as receiver desensitization performance-characteristics of the UE 110 (e.g., desensitization performance-characteristics recorded in the UE-characterization lookup table 218).

Under certain UL transmit power conditions, transmit signal leakage or transmitter noise associated with UL transmissions from the UE 110 to the base station 120 may fall within a receiver (RX) frequency band of one or more wireless links the UE 110 uses for wireless communications (e.g., the wireless links 404, 408, and 130). The transmit signal leakage or transmitter noise can reduce the sensitivity of respective receiver circuitry.

In response to determining the presence of the desensitization condition 410, the UE 110 may transmit a message to the base station 120 that requests the base station to allocate resources of a SUL, allowing the UE 110 to utilize a different frequency band. The base station 120 allocates a portion of SUL resources 416 (e.g., an allocated portion 418 of SUL resources 416).

In general, resources described in FIG. 4 (e.g., DL resources 412, UL resources 414, SUL resources 416, portion 418) may be at a granularity corresponding to a "resource block" level, a granularity corresponding to a "resource element level," or combinations thereof. In some instances, SUL resources 416 may correspond to an advanced wireless service (AWS) supplementary uplink associated with a fourth-generation long-term evolution (4G LTE) frequency band (e.g., ~800 MHz). By the UE 110 using the SUL with the different frequency band for transmissions, TX leakage or TX noise that falls within RX frequency bands of the one or more wireless links (e.g., the wireless link 404, the wireless link 408, the wireless link 130) used by the UE 110 is avoided, effectively alleviating the determined presence of the desensitization condition 410.

Although the desensitization condition 410 as illustrated in FIG. 4 is associated to receiver circuitry of the UE 110 (e.g., receiver circuitry of the 5G NR transceiver 206, the WLAN transceiver 208, the GNSS transceiver 210), the desensitization condition 410 may apply to circuitry that is other than receiver circuitry. Examples of other types of circuitry that may experience the desensitization condition 410 include a touch sensor, a display, and so on.

Figure 5:
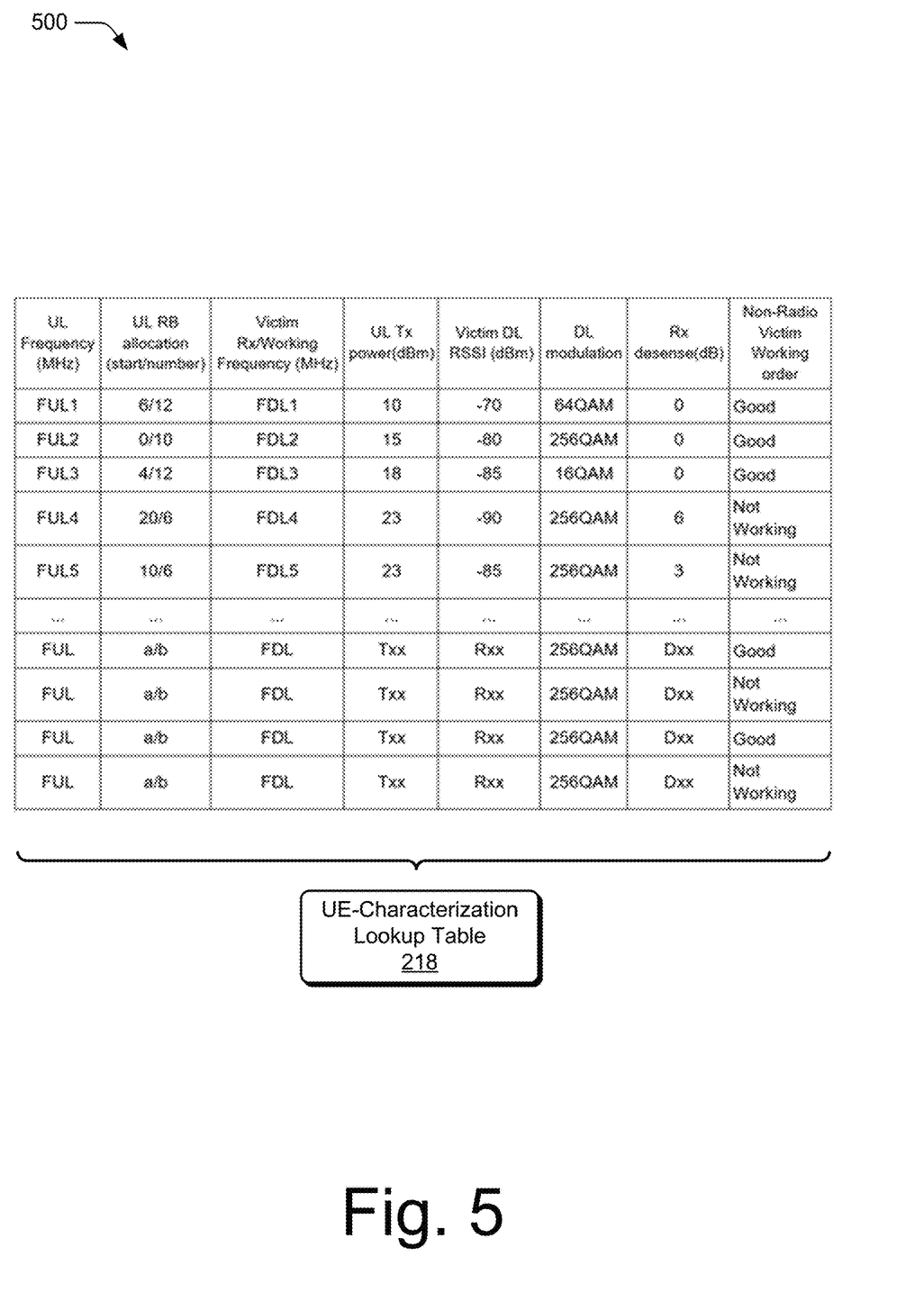
FIG. 5 illustrates details of an example UE-characterization lookup table in accordance with one or more aspects.

FIG. 5 illustrates example details 500 of an example UE-characterization lookup table in accordance with one or more aspects. The characterization table may be the UE-characterization lookup table 218 of FIG. 2.

As illustrated in FIG. 5, different combinations of UL frequencies (e.g., "FUL1") and RB allocation configurations are characterized against DL frequencies that may experience receiver desensitization (e.g., "FDL1", a victim DL frequency). Characterization measurements also include UL TX power, victim DL received signal strength indicator (RSSI), DL modulation, and an amount of receiver desensitization (e.g., illustrated as Rx desense in FIG. 5). The UE-characterization lookup table 218 also includes information that may be pertinent to non-radio victims (e.g., a camera of the UE, a display of the UE) that may be adversely impacted by the UL transmission conditions.

In some instances, the UE 110 (e.g., the processor 212 executing the code of the desensitization manager application 216) may reference the UE-characterization lookup table 218 while an application having a high data-rate demand is executing on the UE 110. The UE 110 may determine that a current TX power setting is desensitizing to receiver of the UE 110, causing a decrease in a DL data rate that is unacceptable, and trigger a message to the base station 120 that requests the base station 120 to allocate resources (e.g., resource blocks or RBs) of unified air interface resources 302 to allow the UE 110 to utilize a portion of the SUL resources (e.g., the portion 418 of the SUL resources 416). In some instances, the portion may correspond to the SUL in its entirety (e.g., all resources of the SUL resources 416).

Example Methods

Figure 6:
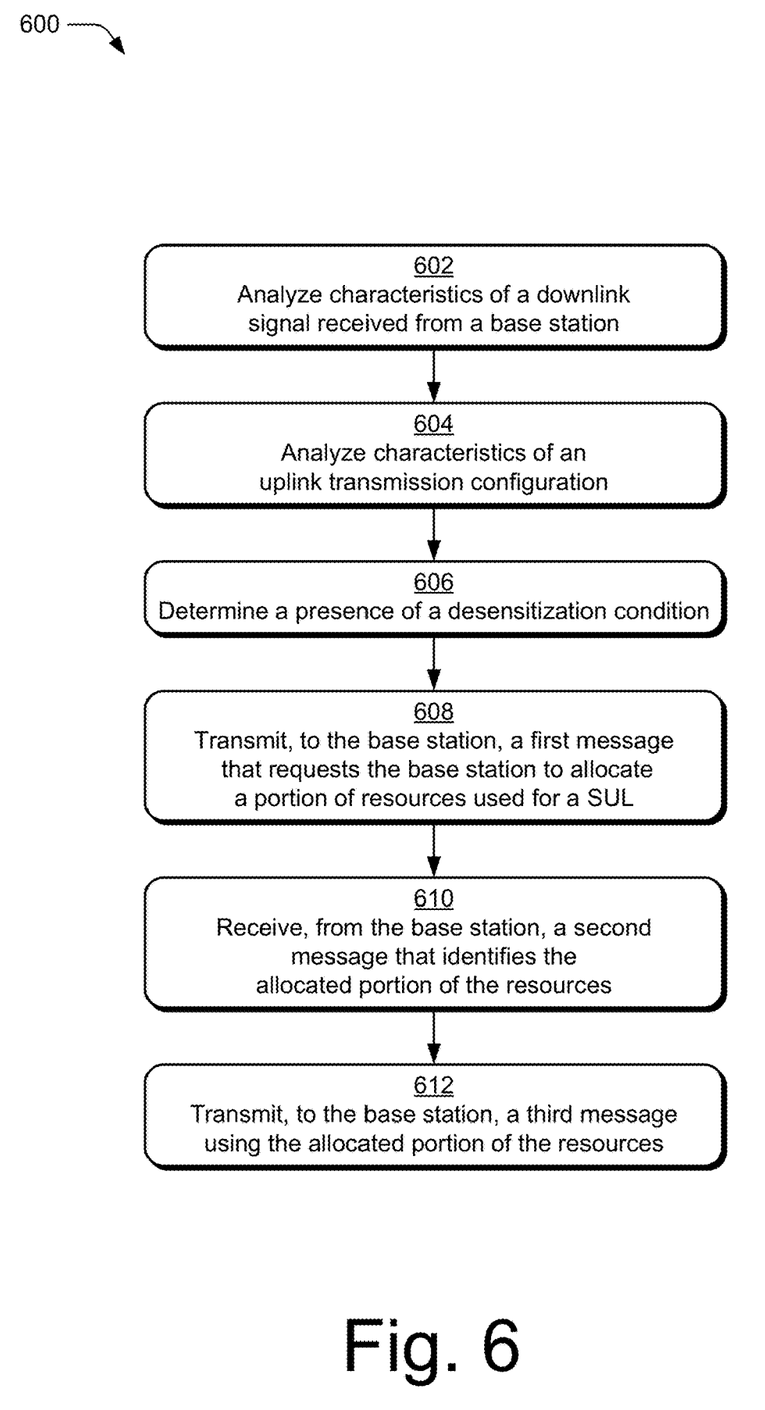
FIG. 6 illustrates an example method performed by a UE wirelessly communicating with a base station in accordance with one or more aspects.

FIG. 6 illustrates an example method 600 performed by a UE wirelessly communicating with a base station in accordance with one or more aspects. The method, illustrated by a series of operational blocks 602-612, may be performed by the UE 110 of FIG. 1 as directed by the processor 212 of FIG. 2 executing the instructions of the desensitization manager application 216. The method 600 may also include elements of FIGS. 2-5. Sequencing of the operational blocks 602-612, including underlying or detailed elements of the operational blocks 602-612, is not limited by the illustration of FIG. 6 or by the description of FIG. 6 hereafter. The operational blocks 602-612, or portions of the operational blocks 602-612, may also be performed by entities other than the UE 110.

At block 602, the UE 110 (e.g., the processor 212 executing the desensitization manager application 216) analyzes characteristics of a downlink signal received from a base station (e.g., a downlink signal that is part of the wireless link 130 between the UE 110 and the base station 120). Analyzing the characteristics of the downlink signal may include, for example, analyzing a received signal strength indicator (RSSI) or a reception frequency band associated with the received downlink signal.

At block 604, the UE 110 analyzes characteristics of an uplink transmission configuration of the UE 110. Analyzing the characteristics of the uplink transmission configuration may include, for example, analyzing a transmission power setting or a transmission frequency band that the UE 110 is set to use for uplink transmissions. At block 606, determines a presence of a desensitization condition (e.g., the desensitization condition 410). In some instances at block 606, determining the presence of the desensitization condition may include the UE 110 referencing a UE-characterization lookup table (e.g., the UE-characterization lookup table 218). The determined desensitization condition at block 606 may, in some instances, be associated with receiver circuitry (e.g., receiver circuitry that is part of the WLAN transceiver 208 or the GNSS transceiver 210). In other instances, the determined desensitization condition at block 606 may be associated with circuitry that is other than receiver circuitry (e.g., a touch sensor, a display of the UE 110, and so on).

At block 608, the UE 110 transmits, to a base station (e.g., the base station 120), a first message that requests the base station 120 to allocate a portion of resources used for a SUL (e.g., SUL resources 416). At block 610 the UE 110 receives, from the base station 120, a second message that identifies the allocated portion of resources of the SUL (e.g., the allocated portion 418 of SUL resources 416). At block 612, the UE 110 transmits, to the base station 120, a third message using the allocated portion 418 of the resources 416.

Figure 7:
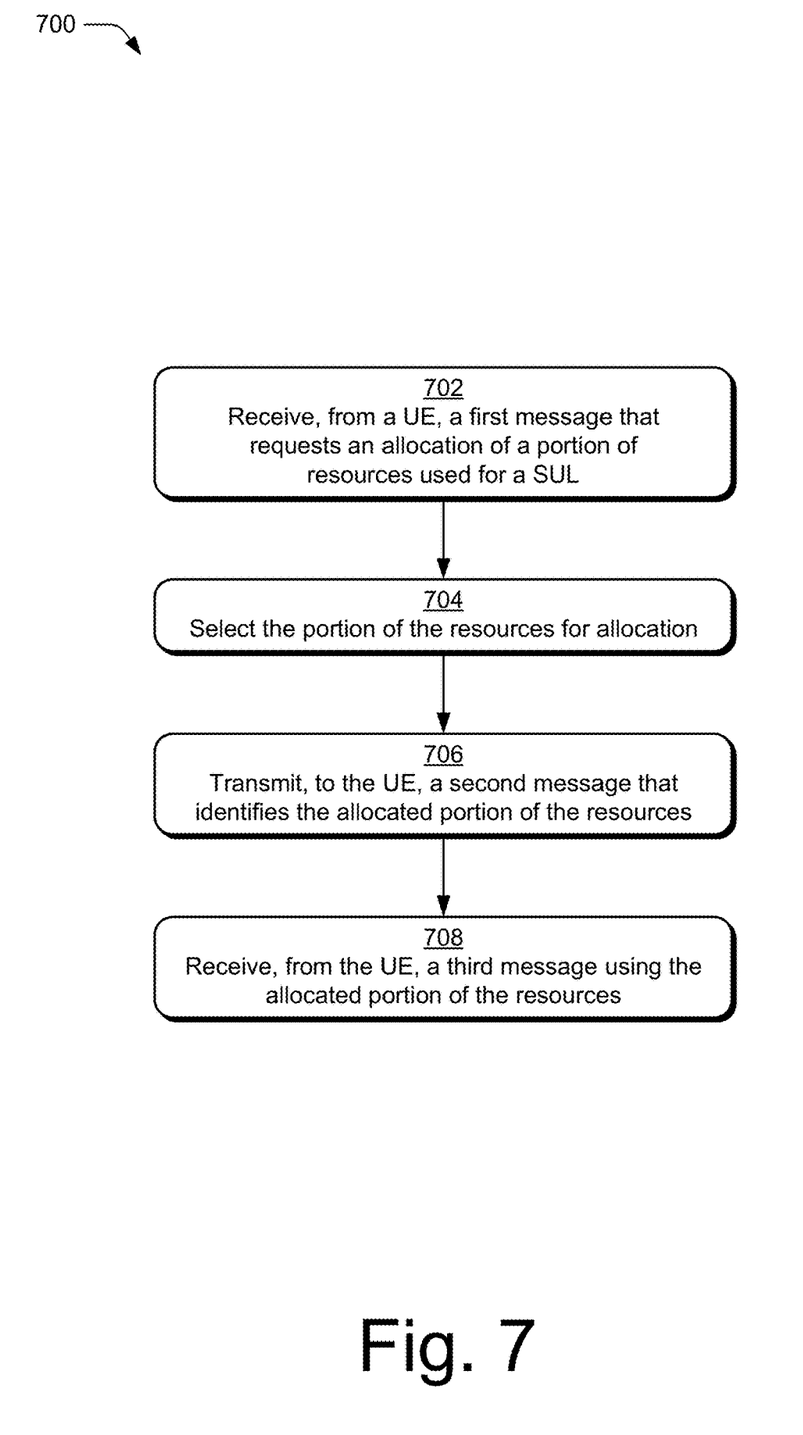
FIG. 7 illustrates an example method performed by a base station wirelessly communicating with a UE in accordance with one or more aspects.

FIG. 7 illustrates an example method performed by a base station wirelessly communicating with a UE in accordance with one or more aspects. The method, illustrated by a series of operational blocks 702-708, may be performed by the base station 120 of FIG. 1 as directed by the processor 258 of FIG. 2 executing the instructions of the base station manager application 262. The method may also include elements of FIGS. 2-5. Sequencing of the operational blocks 702-708, including underlying or detailed elements of the operational blocks 702-708, is not limited by the illustration of FIG. 7 or by the description of FIG. 7 hereafter. The operational blocks 702-708, or portions of the operational blocks 702-708, may also be performed by entities other than the base station 120.

At block 702, the base station 120 receives, from a UE (e.g., the UE 110), a first message that requests an allocation of a portion of resources used for a SUL. At block 704, the base station 120 selects, from the resources of the SUL, the portion of resources for allocation (e.g., the allocated portion 418 of the SUL resources 416).

At block 706, the base station 120 transmits, to the UE 110, a second message that identifies the allocated portion 418 of the SUL resources 416. At block 708, the base station receives, from the UE 110, a third message using the allocated portion 418 of the resources (e.g., SUL resources 416).

Variations

Variations and permutations to the above-described systems and techniques are many. As a first example, as opposed to UE-characterization lookup table 218 being stored in the CRM 214 of the UE 110, the UE-characterization lookup table 218 may be stored in a server that is part of a cloud computing environment.

As a second example, and as opposed to systems and techniques being applicable to an environment where the UE 110 is communicating with the base station 120 using a 5G NR radio access technology (RAT) the systems and techniques are applicable to other RATs (e.g., a 3rd Generation Partnership Long-Term Evolution (3GPP LTE) RAT, Sixth-Generation (6G) RAT). The systems and techniques are further applicable to a multi-RAT environment.

As a third example, and as opposed to the systems and techniques relying on the base station 120 performing allocations of the SUL resources 416 (e.g., selecting the portion 418 of the SUL resources 416), the UE may indicate the portion of 418 resources to the base station 120. In such an instance, messaging may change to include a verification (or acknowledgment/ACK) from the base station 120 that the portion 418 of the SUL resources 416 has been allocated.

EXAMPLES

The following paragraphs recite several examples:

Example 1: A method performed by a user equipment wirelessly communicating with a base station, the method comprising: analyzing characteristics of a downlink signal received from the base station; analyzing characteristics of an uplink transmission configuration of the user equipment; determining, using the analyzed characteristics of the downlink signal and the uplink transmission configuration, a presence of a desensitization condition; transmitting, in response to determining the presence of the desensitization condition and to the base station, a first message that requests the base station to allocate a portion of resources used for a supplementary uplink; receiving, from the base station, a second message that identifies the allocated portion of the resources; and transmitting, to the base station, a third message, the third message transmitted using the allocated portion of the resources.

Example 2: The method as recited by example 1, wherein analyzing the characteristics of the downlink signal includes analyzing a frequency of the downlink signal, a received signal strength indicator of the downlink signal, or a modulation of the downlink signal.

Example 3: The method as recited by example 1, wherein analyzing the characteristics of the uplink transmission configuration includes analyzing a transmission frequency or a transmission power.

Example 4: The method as recited by example 1, wherein the desensitization condition is associated with receiver circuitry of the user equipment.

Example 5: The method as recited by example 4, wherein the receiver circuitry includes receiver circuitry that is part of a Fifth-Generation New Radio transceiver, a wireless local area network transceiver, or a global navigation satellite system transceiver.

Example 6: The method as recited by example 1, wherein the desensitization condition is associated with circuitry of the user equipment that is other than receiver circuitry.

Example 7: The method as recited by example 6, wherein the circuitry that is other than receiver circuitry includes display circuitry, camera circuitry, or touch-sensor circuitry.

Example 8: The method as recited by any of examples 1 to 7, wherein determining the presence of the desensitization condition includes referencing a user equipment characterization lookup table.

Example 9: A user equipment comprising: a processor; and computer-readable storage media storing instructions of a desensitization manager application that, when executed by the processor, directs the user equipment to: analyze characteristics of a downlink signal received from a base station; analyze characteristics of an uplink transmission configuration of the user equipment; determine, using the analyzed characteristics of the downlink signal and the uplink transmission configuration, a presence of a desensitization condition; transmit, in response to determining the presence of the desensitization condition and to the base station, a first message that requests the base station to allocate a portion of resources used for a supplementary uplink; receive, from the base station, a second message that identifies the allocated portion of the resources; and transmit, to the base station, a third message, the third message transmitted using the allocated portion of the resources.

Example 10: The user equipment as recited by example 9, wherein determining the presence of the desensitization condition includes referencing a characterization lookup table.

Example 11: The user equipment as recited by example 10, wherein the characterization lookup table is stored in the computer-readable storage media.

Example 12: The user equipment as recited by example 10, wherein the characterization lookup table is stored in a server that is part of a cloud computing environment.

Example 13: The user equipment as recited by any of examples 10 to 12, wherein the characterization lookup table includes different combinations of uplink frequencies and uplink resource block allocations characterized against one or more measurements that include a downlink received signal strength indicator of a downlink transmission, an uplink transmission power, a downlink modulation, or an amount of receiver desensitization.

Example 14: The user equipment as recited by any of examples 9 to 13, wherein the user equipment is a smartphone, a smartwatch, or an Internet-of-Things device.

Example 15: A method performed by a base station wirelessly communicating with a user equipment, the method comprising: receiving, from the user equipment, a first message that requests an allocation of a portion of resources used for a supplementary uplink; selecting, from the resources used for the supplementary uplink, the portion of the resources for allocation; transmitting, to the user equipment, a second message that identifies the allocated portion of the resources; and receiving, from the user equipment, a third message, the third message received using the allocated portion of the resources.

What is claimed is:

1. A method performed by a user equipment (UE), the method comprising:
communicating, using a Fifth-Generation New Radio (5G NR) transceiver of the UE, with a base station via a wireless link that comprises an uplink in a first frequency band and a downlink in a second frequency band, the first frequency band and the second frequency band being above 3 GHz;
analyzing characteristics of the downlink received from the base station;
analyzing characteristics of an uplink transmission configuration of the 5G NR transceiver of the UE;
determining, using the analyzed characteristics of the downlink and the uplink transmission configuration of the 5G NR transceiver, a presence of a desensitization condition of the UE;
transmitting, in response to determining the presence of the desensitization condition and using the 5G NR transceiver, a first message to the base station that requests the base station to allocate a portion of resources used for a supplementary uplink managed by the base station for uplink communications in frequency bands below 3 GHz;
receiving, from the base station and using the 5G NR transceiver, a second message that identifies a portion of the resources for the supplementary uplink allocated to the UE in a third frequency band below 3 GHz; and
transmitting, using the 5G NR transceiver, a third message to the base station using the portion of the resources for the supplementary uplink allocated to the UE in the third frequency band below 3 GHz.

2. The method as recited by claim 1, wherein analyzing the characteristics of the uplink transmission configuration of the 5G NR transceiver of the UE includes analyzing a transmission frequency setting.

3. The method as recited by claim 1, wherein analyzing the characteristics of the uplink transmission configuration of the 5G NR transceiver of the UE includes analyzing a transmission power setting.

4. The method as recited by claim 1, wherein determining the presence of the desensitization condition includes referencing a characterization lookup table of predefined values that are configured based on a physical design of the UE and the uplink transmission configuration of the 5G NR transceiver of the UE.

5. The method as recited by claim 4, wherein the characterization lookup table includes multiple combinations of uplink frequency bands and downlink frequency bands of the 5G NR transceiver characterized against respective entries for transmission power of the uplink, signal quality of the downlink, and an amount of desensitization of circuitry of the UE.

6. The method as recited by claim 5, wherein the amount of desensitization is associated with receiver circuitry of the 5G NR transceiver of the UE.

7. The method as recited by claim 5, wherein the amount of desensitization is associated with transceiver circuitry of a wireless local area network transceiver of the UE or a global navigation satellite system transceiver of the UE.

8. The method as recited by claim 5, wherein the amount of desensitization is associated with display circuitry, camera circuitry, or touch-sensor circuitry of the UE.

9. The method as recited by claim 5, wherein the multiple combinations of uplink frequency bands and downlink frequency bands of the 5G NR transceiver are further characterized against respective entries for a downlink modulation scheme of the 5G NR transceiver or a received signal strength indicator of the downlink received from the base station.

10. The method as recited by claim 1, wherein the third frequency band of the supplementary uplink is approximately 800 MHz, and the method further comprises:
receiving, using the 5G NR transceiver of the UE, data from the base station via the downlink in the second frequency band above 3 GHz; and
transmitting, using the 5G NR transceiver of the UE, data to the base station via the supplementary uplink in the third frequency band at approximately 800 MHz, the transmission of the data to the base station in the third frequency band effective to mitigate desense desensitization condition of the UE.

11. A user equipment comprising:
a processor;
a Fifth-Generation New Radio (5G NR) transceiver configured to communicate with a base station of a wireless network via a wireless link comprising an uplink in a first frequency band and a downlink in a second frequency band;

computer-readable storage media storing processor-executable instructions that, when executed by the processor, implements a desensitization manager to:

analyze characteristics of the downlink received from the base station based on the user equipment receiving the downlink in the second frequency band, the second frequency band being above 3 GHz;

analyze characteristics of an uplink transmission configuration of the 5G NR transceiver based on the user equipment transmitting the uplink to the base station in the first frequency band, the second frequency band above 3 GHz;

determine, using the analyzed characteristics of the downlink and the uplink transmission configuration of the 5G NR transceiver, a presence of a desensitization condition;

transmit, in response to determining the presence of the desensitization condition and using the 5G NR transceiver, a first message to the base station that requests the base station to allocate a portion of resources used for a supplementary uplink managed by the base station for uplink communications in frequency bands below 3 GHz;

receive, from the base station and using the 5G NR transceiver, a second message that identifies a portion of the resources for the supplementary uplink allocated to the user equipment in a third frequency band below 3 GHz; and transmit using the 5G NR transceiver, a third message to the base station using the portion of the resources for the supplementary uplink allocated to the user equipment in the third frequency band below 3 GHz.

12. The user equipment as recited by claim 11, wherein the desensitization manager is further implemented to analyze a transmission frequency setting as part of analyzing the characteristics of the uplink transmission configuration.

13. The user equipment as recited by claim 11, wherein the desensitization manager is further implemented to analyze a transmission power setting as part of analyzing the characteristics of the uplink transmission configuration.

14. The user equipment as recited by claim 11, wherein the determination of the presence of the desensitization condition is based on a reference to a characterization lookup table of predefined values that are configured based on a physical design of the UE and the uplink transmission configuration of the 5G NR transceiver of the UE.

15. The user equipment as recited by claim 14, wherein the characterization lookup table includes multiple combinations of uplink frequency bands and downlink frequency bands of the 5G NR transceiver characterized against respective entries for transmission power of the uplink, signal quality of the downlink, and an amount of desensitization of circuitry of the user equipment.

16. The user equipment as recited by claim 15, wherein the amount of desensitization is associated with receiver circuitry the 5G NR transceiver of the user equipment.

17. The user equipment as recited by claim 15, wherein the amount of desensitization is associated with transceiver circuitry of a wireless local area network transceiver or a global navigation satellite system transceiver.

18. The user equipment as recited by claim 15, wherein the amount of desensitization is associated with display circuitry, camera circuitry, or touch-sensor circuitry of the user equipment.

19. The user equipment as recited by claim 15, wherein the multiple combinations of uplink frequency bands and downlink frequency bands of the 5G NR transceiver are further characterized against respective entries for a downlink modulation scheme of the 5G NR transceiver or a received signal strength indicator of the downlink received from the base station.

20. The user equipment as recited by claim 11, wherein the user equipment includes a smartphone, a smartwatch, or an Internet-of-Things device.

21. A method performed by a base station, the method comprising:

communicating, using a Fifth-Generation New Radio (5G NR) transceiver of the base station, with a user equipment (UE) via a wireless link that comprises a downlink to the UE in a first frequency band and an uplink from the UE in a second frequency band, the first frequency band and the second frequency band being above 3 GHz;

receiving, from the user equipment, an uplink signal that causes a desensitization condition at the UE due to a transmit power level of the uplink signal transmitted by the UE;

receiving, using the 5G NR transceiver of the base station and from the user equipment, a first message that requests an allocation of resources used for a supplementary uplink managed by the base station for uplink communications in frequency bands below 3 GHz; and transmitting, using the 5G NR transceiver, a second message to the user equipment that indicates a portion of the resources for the supplementary uplink allocated to the UE in a third frequency band below 3 GHz.

* * * * *

UNITED STATES PATENT AND TRADEMARK OFFICE
CERTIFICATE OF CORRECTION

PATENT NO. : 11,974,313 B2
APPLICATION NO. : 17/287324
DATED : April 30, 2024
INVENTOR(S) : Fei He and Bao Phuc Hoang It is certified that error appears in the above-identified patent and that said Letters Patent is hereby corrected as shown below:

In the Claims

Column 14, Line 8: After "circuitry" before "the", add --of--

Signed and Sealed this
Twenty-fifth Day of June, 2024

Katherine Kelly Vidal
*Director of the United States Patent and Trademark Office*